US011863633B2

(12) United States Patent
Zhang

(10) Patent No.: US 11,863,633 B2
(45) Date of Patent: Jan. 2, 2024

(54) CLOUD COMMUNICATION METHOD AND APPARATUS

(71) Applicant: GUANGDONG OPPO MOBILE TELECOMMUNICATIONS CORP., LTD., Guangdong (CN)

(72) Inventor: Jun Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 122 days.

(21) Appl. No.: 17/521,194

(22) Filed: Nov. 8, 2021

(65) Prior Publication Data

US 2022/0060560 A1 Feb. 24, 2022

Related U.S. Application Data

(63) Continuation of application No. PCT/CN2019/121340, filed on Nov. 27, 2019.

(30) Foreign Application Priority Data

May 9, 2019 (CN) .......................... 201910385961.1

(51) Int. Cl.
*H04L 67/303* (2022.01)
(52) U.S. Cl.
CPC .................................. *H04L 67/303* (2013.01)
(58) Field of Classification Search
CPC .................... H04L 67/303; H04N 21/25833
See application file for complete search history.

(56) References Cited

U.S. PATENT DOCUMENTS

| 2002/0199004 | A1 | 12/2002 | Jaye |
| 2005/0021747 | A1 | 1/2005 | Jave |
| 2008/0288635 | A1 | 11/2008 | Jaye |
| 2011/0093523 | A1 | 4/2011 | Jaye |
| 2013/0067550 | A1 | 3/2013 | Chen |
| 2018/0270219 | A1 | 9/2018 | Li |
| 2019/0288996 | A1 | 9/2019 | Li |
| 2020/0106782 | A1* | 4/2020 | Sion ........................ G06F 21/31 |

FOREIGN PATENT DOCUMENTS

| CN | 103001999 A | 3/2013 |
| CN | 103229548 A | 7/2013 |
| CN | 105554004 A | 5/2016 |

(Continued)

OTHER PUBLICATIONS

International Search Report in the international application No. PCT/CN2019/121340, dated Mar. 2, 2020.

(Continued)

*Primary Examiner* — Esther B. Henderson
(74) *Attorney, Agent, or Firm* — Ladas & Parry LLP

(57) ABSTRACT

A method and an apparatus for cloud communication are provided. The method comprises: a client triggers creation of a virtual device performed by a first cloud platform; the client configures registration information for the virtual device, wherein the registration information is used for registration of the virtual device with a second cloud platform; and the client communicates with the second cloud platform or the first cloud platform by means of the virtual device on the first cloud platform.

19 Claims, 7 Drawing Sheets

(56) References Cited

FOREIGN PATENT DOCUMENTS

| | | |
|---|---|---|
| CN | 105991734 A | 10/2016 |
| CN | 107707622 A | 2/2018 |
| CN | 109660567 A | 4/2019 |

OTHER PUBLICATIONS

First Office Action of the Chinese application No. 201910385961.1, dated Apr. 23, 2021.
Notice of Allowance of the Chinese application No. 201910385961.1, dated Jun. 24, 2022.
Written Opinion of the International Search Authority in the international application No. PCT/CN2019/121340, dated Mar. 2, 2020.

* cited by examiner

CLOUD COMMUNICATION METHOD AND APPARATUS

CROSS-REFERENCE TO RELATED APPLICATION

This is a continuation application of International Patent Application No. PCT/CN2019/121340, filed on Nov. 27, 2019, which claims priority to Chinese Patent Application No. 201910385961.1, filed on May 9, 2019, the contents of which are hereby incorporated by reference in their entirety.

BACKGROUND

The Open Connectivity Foundation (OCF) defines client and server. The server refers to a device that provides resources. The client refers to a device that accesses resources.

A cloud platform may implement remote communication between a client and a server. However, a client and a server are required to be connected to the same cloud platform for remote communication. A client and a server that are connected to different cloud platforms cannot communicate remotely.

SUMMARY

The present disclosure relates to the technical field of the Internet of Things (IoT), and particularly to a cloud communication method and apparatus.

For solving the foregoing technical problem, embodiments of the present disclosure provide a cloud communication method and apparatus.

The embodiments of the present disclosure provide a cloud communication method, which may include the following operations.

A client triggers a first cloud platform to create a virtual device.

The client configures registration information for the virtual device, the registration information being used for a registration of the virtual device to a second cloud platform.

The client performs a communication with the second cloud platform or the first cloud platform via the virtual device in the first cloud platform.

The embodiments of the present disclosure provide a cloud communication method, which may include the following operations.

A first cloud platform creates a virtual device.

The virtual device acquires registration information from a client, and performs a registration to a second cloud platform based on the registration information.

The first cloud platform performs a communication with the second cloud platform via the virtual device.

The embodiments of the present disclosure provide a cloud communication apparatus, which include a processor, and the processor is configured to:

trigger a first cloud platform to create a virtual device;
configure registration information for the virtual device, the registration information being used for a registration of the virtual device to a second cloud platform;
perform a communication with the second cloud platform or the first cloud platform via the virtual device in the first cloud platform.

BRIEF DESCRIPTION OF THE DRAWINGS

The drawings illustrate embodiments discussed in the disclosure as examples rather than limits.

DETAILED DESCRIPTION

The technical solutions in the embodiments of the present disclosure will be described below in combination with the drawings in the embodiments of the present disclosure. It is apparent that the described embodiments are not all embodiments but part of embodiments of the present disclosure. All other embodiments obtained by those of ordinary skill in the art based on the embodiments in the application without creative work shall fall within the scope of protection of the application.

For ease of understanding the technical solutions of the embodiments of the present disclosure, related arts involved in the embodiments of the present disclosure will be described at first below. It is to be noted that the following related arts may be freely combined with the technical solutions of the embodiments of the present disclosure for implementation, or the technical solutions of the embodiments of the present disclosure may be independently implemented.

The OCF adopts a Representational State Transfer ful (RESTful) architecture to represent a physical IoT device as well as information of functional service provided by the device, a state of the device, etc., through a resource. A device that provides the resource is a server, and a device that accesses the resource is a client. The client and the server defined in the OCF are logical functional entities. A device may be a client, or a server, or both the client and the client.

Service interactions between a client and a server are implemented by performing a RESTful operation on a resource. The RESTful operation may be a Create-Retrieve-Update-Delete-Notify (CRUDN) operation. Clearly, the CRUDN operation may be any one or more of the following operations: create operation, retrieve operation, update operation, delete operation, or notify operation. The client is an initiator of the RESTful operation, and the server is a responder of the RESTful operation. The client sends a resource operation request to the server to request for operating the resource in the server. The server executes a resource operation, and returns a response to the client, the response carrying a content of the resource and descriptive information of the resource.

Figure 1:
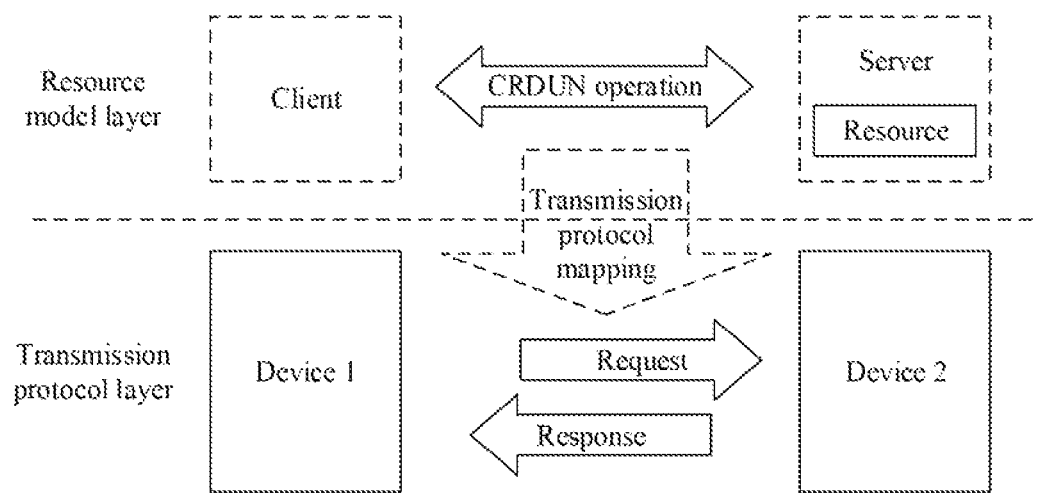
FIG. 1 is an optional communication architecture diagram according to an embodiment of the present disclosure.

FIG. 1 is an optional communication architecture diagram according to an embodiment of the present disclosure. A resource model layer describes resources. Each resource corresponds to a specified Uniform Resource Identifier (URI). A resource may be accessed by accessing the URI of the resource. In addition, there is a corresponding interface supporting a RESTful operation for each resource. A transmission protocol layer transmits contents and descriptive information of the resources. A resource operation is mapped to a specific transmission protocol to convert the RESTful operation of each resource into an entity message transmitted between devices, to provide means for interconnection and intercommunication of the devices.

To representing an association relationship between resources, the OCF defines resource link. An OCF server may provide its own resources in a resource link form such that an OCF client discovers its own resources. Parameters of an OCF link are illustrated in following Table 1.

TABLE 1

| Parameter | Meaning |
| --- | --- |
| anchor | The context URI, representing the URI of the owner resource including the Link |
| href | The target URI, i.e., the URI of the target resource referenced by the Link |
| rel | The relationship between the referenced resource URI and the context URI |
| rt | The resource type Identifier (ID) of the target resource |
| eps | The message endpoints capable of accessing the target resource |

Figure 2:
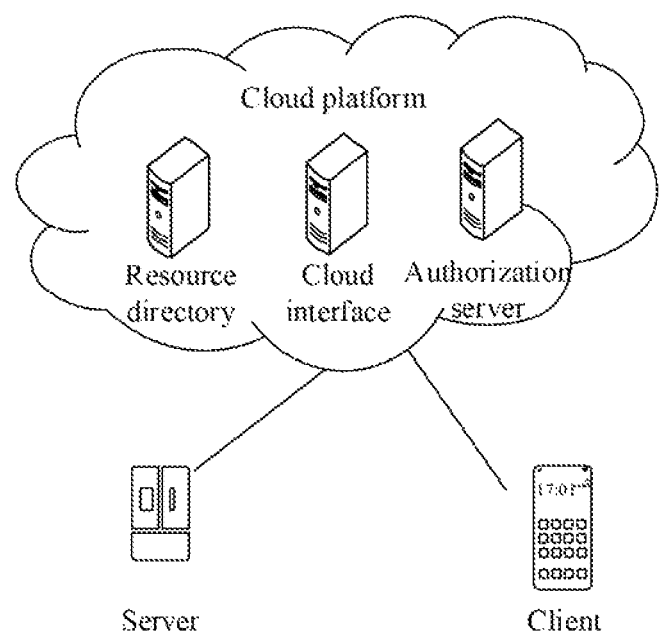
FIG. 2 is an optional cloud deployment architecture diagram according to an embodiment of the present disclosure.

FIG. 2 is an optional cloud deployment architecture diagram according to an embodiment of the present disclosure. A cloud may also be called a cloud platform. In at least one embodiment, the cloud platform may be an IoT cloud platform. As illustrated in FIG. 2, the cloud platform includes the following three entities:

A cloud interface: the cloud interface is an anchor in the cloud platform, and is responsible for access management of a server as well as message routing for remote communication between a client and the server.

An authorization server: the authorization server is responsible for registration of the server and the client as well as authorization of the client and the server.

A resource directory: the resource directory stores resource indexes of the server, and the client may retrieve the resource directory to acquire resources of the server.

The client and the server may communicate with each other via the cloud platform. An overall intercommunication flow includes the following operations.

In operation 1, a user creates a cloud platform account.

Specifically, a function of a mediator is provided in the client of a user side. A Uniform Resource Locator (URL) of the cloud interface is configured in the mediator. The user registers a user name and a password on the cloud platform via the mediator.

In operation 2, the mediator provides an access token for the cloud platform for mediator registration, and the cloud verifies the access token, and allocates a user ID. If the same user uses different mediators, the authorization server may provide different access tokens. However, the same user is associated with the same user ID when using any mediator.

In operation 3, the mediator is connected to the server by a normal device discovery flow, and then requests the access token for the server to the cloud platform. The mediator updates resource "oic.r.coapcloudconf" in the server with the access token, a URI of the cloud interface, and a Universal Unique Identifier (UUID) of the cloud. Here, the access token is configured for initial registration of the server to the cloud platform.

In operation 4, after the mediator configures resource "oic.r.coapcloudconf" of the server, the server establishes a Transport Layer Security (TLS) connection with the cloud by using a preset digital certificate. The server is required to send an UPDATE request to account resource "/oic/sec/account" in the cloud platform to be registered to the cloud platform, the UPDATE request including the access token configured in resource "oic.r.coapcloudconf".

In operation 5, the server is required to log in to the cloud platform to implement data transmission between the server and the cloud platform, and the server sends an UPDATE request to session resource "/oic/sec/session" of the cloud platform. After the cloud platform successfully verifies the UPDATE request, a session connection is established between the server and the cloud platform, and data exchange may be started.

In operation 6, after the session connection is established between the server and the cloud platform, the server exposes the resources it bears in the resource directory of the cloud platform for the client to access these resources remotely.

In operation 7, when the client makes a request of executing a CRUDN operation to resources referenced by resource links born by the cloud platform, the cloud platform forwards the request to the server that practically bears the resources, the server makes a response to the request of the cloud platform, and then the cloud forwards the response to the client.

The abovementioned flow mainly describes a flow of registration of the server to the cloud platform. Like the server, the client is registered to the cloud platform according to the same flow.

At present, a client and a server are required to be connected to the same cloud platform for remote communication. A client and a server that are connected to different cloud platforms cannot communicate remotely. For example, devices of a user include controller A, OCF device A, controller B, and OCF device B. Here, the controller refers to a client, and the OCF device refers to a server. Controller A and OCF device A are connected to cloud platform A, and controller B and OCF device B are connected to cloud platform B. According to a conventional art, controller A cannot communicate with OCF device B remotely. On the other hand, different providers may provide different cloud platform service. If a user uses products of more than two providers, respective clients are required to be used for control respectively, which makes it impossible to control all servers on an operation interface of the same client. Therefore, the following technical solutions of the embodiments of the present disclosure are proposed.

Figure 3:
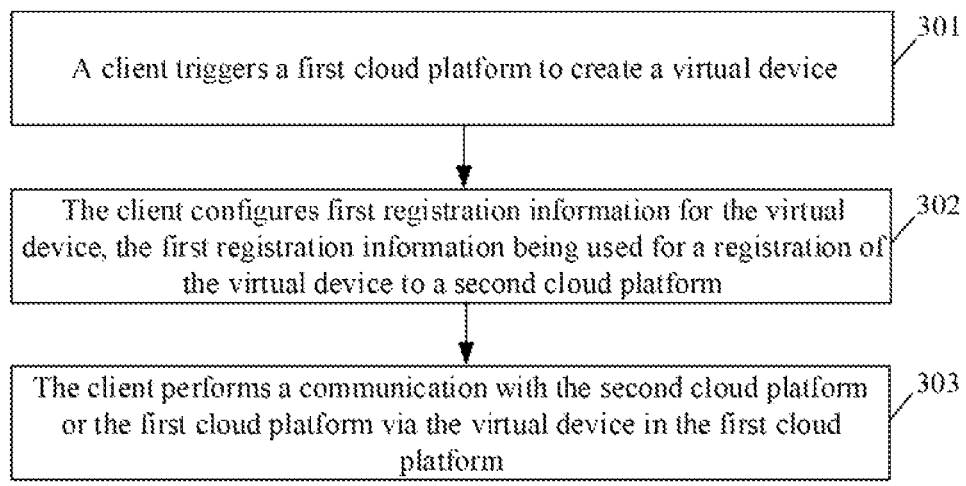
FIG. 3 is a first flowchart of a cloud communication method according to an embodiment of the present disclosure.

FIG. 3 is a first flowchart of a cloud communication method according to an embodiment of the present disclosure. The configuration method includes the following operations.

In operation 301, a client triggers a first cloud platform to create a virtual device.

In the embodiment of the present disclosure, the client may also be described as an Application (APP). The client is on a user equipment side. Here, the user equipment may be a device such as a mobile phone, a tablet computer, a notebook, and a vehicle-mounted terminal. In an implementation, the client is provided with a mediator. The mediator may be developed by multiple cloud platforms (for example, the first cloud platform and a second cloud platform). Specifically, the mediator may carry related information of the multiple cloud platforms. Here, the related information includes information of a platform certificate, URL, etc., of the cloud platform. As such, the mediator may perform information interaction with the multiple cloud platforms.

In the embodiment of the present disclosure, before communicating with any cloud platform, the client is required to log in to the cloud platform. Specifically, taking the first cloud platform as an example, if a user has registered account User_ID_A to the first cloud platform, the user logs in to the first cloud platform by using account User_ID_A in the client, and then the client may communicate with the first cloud platform.

In the embodiment of the present disclosure, the operation that the client triggers the first cloud platform to create the virtual device may be implemented in the following manner.

In manner 1), the client sends a first request message to the first cloud platform, the first request message being used to request the first cloud platform to create the virtual device.

In manner 2), the client receives a first response message from the first cloud platform, the first response message being used to indicate that the virtual device has been successfully created.

For example, a virtual device creation interface (called interface 1 hereinafter) is added to the first cloud platform, such as interface/virtualdevice. The mediator sends an update request message (i.e., the first request message) to interface 1 in the first cloud platform, and the first cloud platform creates the virtual device. The virtual device is embodied in a resource form in the first cloud platform, such as resource oic.r.coapcloudconf.

It is to be noted that the virtual device has a first device ID (called Device_ID hereinafter). The first device ID may be configured in any one of the following manners.

A first manner: the first device ID is configured by the client and carried in the first request message.

A second manner: the first device ID is configured by the first cloud platform and carried in the first response message.

In an optional implementation, the first cloud platform may establish an association relationship between Device ID and User_ID_A after completing creating the virtual device.

In operation 302, the client configures registration information for the virtual device, the registration information being used for a registration of the virtual device to a second cloud platform.

In the embodiment of the present disclosure, the operation that the client configures the registration information for the virtual device may be implemented in the following manner.

In manner A), the client acquires security information of the virtual device from the second cloud platform.

In manner B), the client configures the registration information for the virtual device based on the security information.

Here, the client is also required to log in to the second cloud platform before communicating with the second cloud platform. Specifically, if the user has registered account User_ID_B to the second cloud platform, the user logs in to the second cloud platform by using account User_ID_B in the client, and then the client may communicate with the second cloud platform.

For manner A), the client sends a second request message to the second cloud platform, the second request message being used to request the second cloud platform to create an account for the virtual device. The client receives a second response message from the second cloud platform, the second response message being used to indicate that the account has been successfully created for the virtual device, and the second response message carrying the security information of the virtual device.

For example, there is an additional account creation interface (called interface 2 hereinafter) in the second cloud platform, such as interface/account. The mediator sends an update request message (i.e., the second request message) to interface 2 of the second cloud platform, the update request message carrying Device_ID of the virtual device. The second cloud platform creates the account for the virtual device based on Device_ID, i.e., resource /account. The second cloud platform generates an access token (called Access_Token_D) for the virtual device after creating the account. The second cloud platform returns Access_Token_D to the mediator by an update response message (i.e., the second response message). Here, Access_Token_D may be an original access token of the mediator, or may be a newly generated access token.

For manner B), the mediator configures a resource (such as resource oic.r.coapcloudconf) in the first cloud platform for the virtual device by using ID information of the second cloud platform and Access_Token_D. Specifically, the mediator fills a corresponding attribute of resource oic.r.coapcloudconf with the abovementioned contents. It is to be noted that the ID information of the second cloud platform includes at least one of a URI or a UUID. Then, the virtual device may be registered to the second cloud platform by using configured resource oic.r.coapcloudconf. Specifically, the virtual device is connected to the second cloud platform according to an ID of the second cloud platform, and updates resource /account of the second cloud platform with information of Access_Token_D, Device_ID, etc. The second cloud platform verifies Access_Token_D, and after successful verification, associates Access_Token_D with User_ID_B and Device_ID. As such, a registration process of the virtual device to the second cloud platform is completed.

In operation 303, the client performs communication with the second cloud platform or the first cloud platform via the virtual device in the first cloud platform.

In the technical solutions of the embodiments of the present disclosure, the virtual device is created in the first cloud platform, and the virtual device is registered to the second cloud platform, thereby implementing the communication between the virtual device and the second cloud platform. When logging in to the first cloud platform, the client may not only communicate with the first cloud platform but also communicate with the second cloud platform via the virtual device in the first cloud platform to further remotely control a server connected with the second cloud platform.

In the embodiment of the present disclosure, a communication flow may be, but not limited to, the following scenes.

Scene 1: a server is connected with the second cloud platform, and the virtual device is a virtual client device.

In this scene, the client is connected with the first cloud platform, the server is connected with the second cloud platform, and there is the virtual client device in the first cloud platform. The client may log in to the first cloud platform to implement communication with the server.

Optionally, in a communication manner, the client acquires resource information of the server from the first cloud platform, the resource information of the server being acquired by the virtual device from the second cloud platform.

For example, the virtual device establishes a session connection with the second cloud platform. The virtual device as the client acquires the resource information in the second cloud platform. Here, there is made such a hypothesis that the server is connected to the second cloud platform, and a resource of the server is published to a resource directory of the second cloud platform. In such case, the virtual device may acquire the resource information of the server from the resource directory of the second cloud platform. Here, the resource information includes, but not limited to, resource address information. The virtual device adds path Device_ID in front of the obtained resource information of the server and publishes it to a resource directory of the first cloud platform. When the client sends a resource query instruction to the first cloud platform, the first cloud platform returns the stored resource information to the client.

Optionally, in a communication manner, the client sends a first instruction to the first cloud platform, the first instruction being sent to the second cloud platform via the virtual device in the first cloud platform and being forwarded to the server by the second cloud platform.

For example, the client sends the first instruction to the server. A path of the first instruction is as follows: the client→the virtual device in the first cloud platform→the second cloud platform→the server.

Optionally, in a communication manner, the client receives a second instruction from the first cloud platform, the second instruction being sent to the second cloud platform by the server and forwarded to the virtual device in the first cloud platform by the second cloud platform.

For example, the server sends the second instruction to the client. A path of the second instruction is as follows: the server→the second cloud platform→the virtual device in the first cloud platform→the client.

It is to be noted that the abovementioned communication manners may be independently implemented, or may be freely combined for implementation.

Scene 2: a server is connected with the first cloud platform, and the virtual device is a virtual server device.

In this scene, the client is connected with the second cloud platform, the server is connected with the first cloud platform, and there is the virtual server device in the first cloud platform. The client may log in to the second cloud platform to implement communication with the server.

Optionally, in a communication manner, the client acquires resource information of the server from the second cloud platform, the resource information of the server being sent to the second cloud platform by the virtual device.

For example, the server is connected to the first cloud platform, and a resource of the server is published to a resource directory of the first cloud platform. The virtual device as the server publishes the resource information in the first cloud platform to the second cloud platform. In such case, the client may acquire the resource information of the server from the second cloud platform. Here, the resource information includes, but not limited to, resource address information.

Optionally, in a communication manner, the client sends a first instruction to the second cloud platform, and the first instruction is sent to the virtual device in the first cloud platform via the second cloud platform, and is forwarded to the server by the first cloud platform.

For example, the client sends the first instruction to the server. A path of the first instruction is as follows: the client→the second cloud platform→the virtual device in the second cloud platform→the server.

Optionally, in a communication manner, the client receives a second instruction from the second cloud platform, and the second instruction is sent to the first cloud platform by the server, and is forwarded to the second cloud platform by the virtual device in the first cloud platform.

For example, the server sends the second instruction to the client. A path of the second instruction is as follows: the server→the virtual device in the first cloud platform→the second cloud platform→the client.

Figure 4:
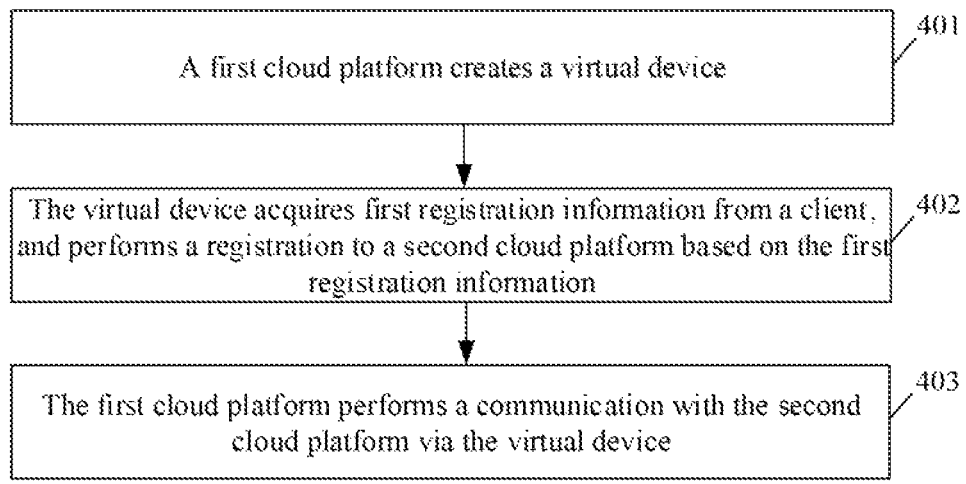
FIG. 4 is a second flowchart of a cloud communication method according to an embodiment of the present disclosure.

FIG. 4 is a second flowchart of a cloud communication method according to an embodiment of the present disclosure. The configuration method includes the following operations.

In operation 401, a first cloud platform creates a virtual device.

In the embodiment of the present disclosure, the operation that the first cloud platform creates the virtual device may be implemented in the following manner.

In manner 1), the first cloud platform receives a first request message from a client, the first request message being used to request the first cloud platform to create the virtual device.

In manner 2), after successfully creating the virtual device, the first cloud platform sends a first response message to the client, the first response message being used to indicate that the virtual device has been successfully created.

For example, a virtual device creation interface (called interface 1 hereinafter) is added to the first cloud platform, such as interface /virtualdevice. A mediator sends an update request message (i.e., the first request message) to interface 1 in the first cloud platform, and the first cloud platform creates the virtual device. The virtual device is embodied in a resource form in the first cloud platform, such as resource oic.r.coapcloudconf.

It is to be noted that the virtual device has a first device ID (called Device_ID hereinafter). The first device ID may be configured in any one of the following manners.

A first manner: the first device ID is configured by the client and carried in the first request message.

A second manner: the first device ID is configured by the first cloud platform and carried in the first response message.

In an optional implementation, the first cloud platform may establish an association relationship between Device_ID and User_ID_A after completing creating the virtual device.

In operation 402, the virtual device acquires registration information from a client, and performs registration to a second cloud platform based on the registration information.

In the embodiment of the present disclosure, there is an additional account creation interface (called interface 2 hereinafter) in the second cloud platform, such as interface /account. The mediator sends an update request message to interface 2 of the second cloud platform, the update request message carrying Device ID of the virtual device. The second cloud platform creates the account for the virtual device based on Device_ID, i.e., resource /account. The second cloud platform generates an access token (called Access_Token_D) for the virtual device after creating the account. The second cloud platform returns Access_Token_D to the mediator by an update response message (i.e., the second response message). Here, Access_Token_D may be an original access token of the mediator, or may be a newly generated access token. The mediator configures a resource (such as resource oic.r.coapcloudconf) in the first cloud platform for the virtual device by using ID information of the second cloud platform and Access_Token_D. Specifically, the mediator fills a corresponding attribute of resource oic.r.coapcloudconf with the abovementioned contents. It is to be noted that the ID information of the second cloud platform includes at least one of a URI or a UUID.

Then, the virtual device may be registered to the second cloud platform by using configured resource oic.r.coapcloudconf. Specifically, the virtual device is connected to the second cloud platform according to an ID of the second cloud platform, and updates resource /account of the second cloud platform with information of Access_Token_D, Device_ID, etc. The second cloud platform verifies Access_Token_D, and after successful verification, associates Access_Token_D with User_ID_B and Device_ID. As such, a registration process of the virtual device to the second cloud platform is completed.

In operation 403, the first cloud platform performs communication with the second cloud platform via the virtual device.

In the embodiment of the present disclosure, a communication flow may be, but not limited to, the following scenes.

Scene 1: a server is connected with the second cloud platform, and the virtual device is a virtual client device.

In this scene, the client is connected with the first cloud platform, the server is connected with the second cloud platform, and there is the virtual client device in the first cloud platform. The client may log in to the first cloud platform to implement communication with the server.

Optionally, in a communication manner, the first cloud platform acquires resource information of the server from the second cloud platform via the virtual device.

For example, the virtual device establishes a session connection with the second cloud platform. The virtual device as the client acquires the resource information in the second cloud platform. Here, there is made such a hypothesis that the server is connected to the second cloud platform, and a resource of the server is published to a resource directory of the second cloud platform. In such case, the virtual device may acquire the resource information of the server from the resource directory of the second cloud platform. Here, the resource information includes, but not limited to, resource address information. The virtual device adds path Device_ID in front of the obtained resource information of the server and publishes it to a resource directory of the first cloud platform.

Optionally, in a communication manner, after receiving a first instruction from the client, the first cloud platform forwards the first instruction to the second cloud platform via the virtual device, then the first instruction is forwarded to the server via the second cloud platform.

For example, the client sends the first instruction to the server. A path of the first instruction is as follows: the client→the virtual device in the first cloud platform→the second cloud platform→the server.

Optionally, in a communication manner, after receiving a second instruction from the second cloud platform via the virtual device, the first cloud platform sends the second instruction to the client.

For example, the server sends the second instruction to the client. A path of the second instruction is as follows: the server→the second cloud platform→the virtual device in the first cloud platform→the client.

It is to be noted that the abovementioned communication manners may be independently implemented, or may be freely combined for implementation.

Scene 2: a server is connected with the first cloud platform, and the virtual device is a virtual server device.

In this scene, the client is connected with the second cloud platform, the server is connected with the first cloud platform, and there is the virtual server device in the first cloud platform. The client may log in to the second cloud platform to implement communication with the server.

Optionally, in a communication manner, the first cloud platform sends resource information of the server to the second cloud platform via the virtual device.

For example, the server is connected to the first cloud platform, and a resource of the server is published to a resource directory of the first cloud platform. The virtual device as the server publishes the resource information in the first cloud platform to the second cloud platform. Here, the resource information includes, but not limited to, resource address information.

Optionally, in a communication manner, after receiving a first instruction from the server, the first cloud platform forwards the first instruction to the second cloud platform via the virtual device, then the first instruction is forwarded to the client via the second cloud platform.

For example, the client sends the first instruction to the server. A path of the first instruction is as follows: the client→the second cloud platform→the virtual device in the first cloud platform→the server.

Optionally, in a communication manner, after receiving a second instruction from the second cloud platform via the virtual device, the first cloud platform sends the second instruction to the server.

For example, the server sends the second instruction to the client. A path of the second instruction is as follows: the server→the virtual device in the first cloud platform→the second cloud platform→the client.

The technical solutions of the embodiments of the present disclosure will be exemplarily described below in combination with specific application examples. It is to be noted that the following application examples are merely optional solutions of the present disclosure and not intended to limit the scope of protection of the embodiments of the present disclosure.

Application Example 1

Figure 5:
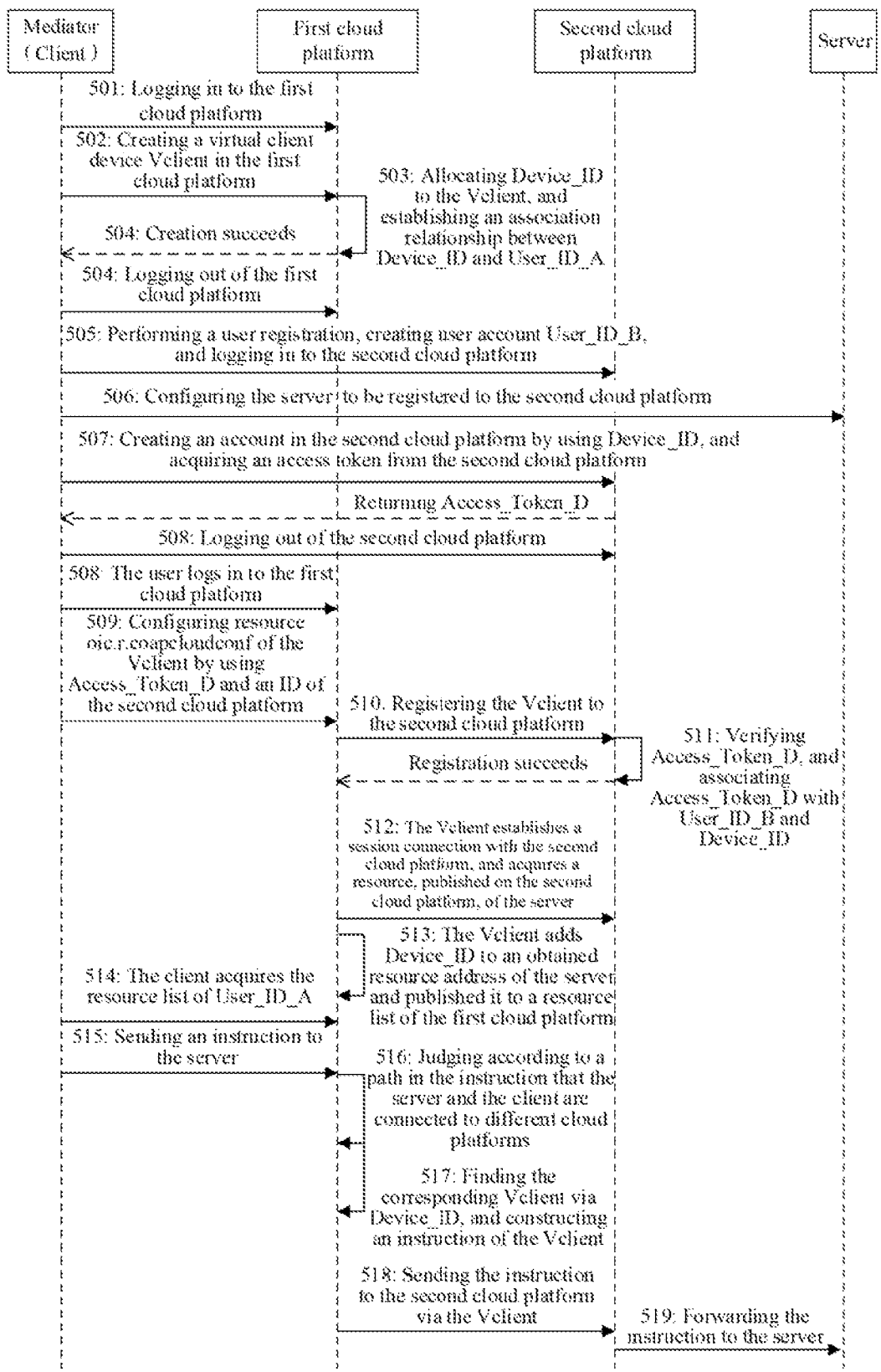
FIG. 5 is a third flowchart of a cloud communication method according to an embodiment of the present disclosure.

FIG. 5 is a third flowchart of a cloud communication method according to an embodiment of the present disclosure. As illustrated in FIG. 5, a flow of the cloud communication method includes the following operations.

In operation 501, a user logs in to a first cloud platform by using account User_ID_A.

Here, it is assumed that the user has registered account User_ID_A to the first cloud platform, and the user may log in to the first cloud platform by using User_ID_A in a client.

In operation 502, a virtual device creation interface is accessed to create a virtual client device Vclient in the first cloud platform.

Here, there is the virtual device creation interface in the first cloud platform. The virtual device creation interface is, for example, interface /virtualdevice. The first cloud platform provides a resource link of the virtual device creation interface. A mediator may update virtual device information to the resource link to create a virtual device in the first cloud platform.

Here, the Vclient is embodied as a resource in the first cloud platform. The resource is, for example, resource oic.r.coapcloudconf.

In operation 503, Device_ID is allocated to the Vclient, and the first cloud platform establishes an association relationship between Device_ID and User_ID_A.

Here, after the Vclient is created, a configuration interface of resource "oic.r.coapcloudconf" may be exposed. The configuration interface is, for example, /virtualdevice/<deviceID>/coapcloudconf, where <deviceID> represents a device ID of the Vclient. In an example, <deviceID> is 88B7C7F0-4B51-4EOA-9FAA-CIB439FD7F49, and correspondingly, the configuration interface is /virtualdevice/88B7C7F0-4B51-4EOA-9FAA-C1B439FD7F49/coapcloudconf.

Device_ID may be specified, carried in an update request message, and sent to interface/virtualdevice by the mediator when the Vclient is created: or may be allocated, carried in an update response message, and returned to the mediator by the first cloud platform when the Vclient is created.

In operation 504, after successful creation, the user logs out of the first cloud platform.

Here, logging out of the first cloud platform refers to session logout or session disconnection from the first cloud platform.

In operation 50S, a mediator is connected to a second cloud platform for user registration, user account User_ID_B is created, and login to the second cloud platform is performed.

Here, if an account has been registered to the second cloud platform, login may be directly performed without creating an account. If it is first login on the client, a user name and password in the second cloud platform are required to be input. If it is not first login, an access token of the second cloud platform is kept in the client, and the user does not need to input the user name and the password, and directly establishes a session with the second cloud platform by using the access token.

In operation 506, the mediator configures a server to be registered to a second cloud platform.

Here, the operation that the mediator configures the server to be registered to the second cloud platform includes the following operations. The mediator acquires an access token of the server from the second cloud platform. The mediator configures resource coapcloudconf of the server. The server is connected with the second cloud platform, and the server is registered to the second cloud platform according to resource coapcloudconf. Then, the server establishes the session with the second cloud platform, and the server publishes its own resource to the second cloud platform.

It is to be noted that operation 506 may also be executed after operation 507.

In operation 507, the mediator creates an account in the second cloud platform by using Device_ID, and acquires an access token from the second cloud platform.

Specifically, the mediator sends an update request to an account creation interface of the second cloud platform, the request carrying Device_ID. Here, the account creation interface is, for example, interface /account. The update request is configured to create an account of a Vclient in the second cloud platform. A creation form may be one of the following two forms.

Form 1: A data sheet including a device ID, a user ID and an access token is maintained in the second cloud platform. When an update request pointing to interface /account is received, an item is added to the sheet, and Device_ID is extracted from the update request and inserted to an entry corresponding to the item.

Form 2: Multiple resources /account are stored in the second cloud platform in a distributed manner, and resources may be dynamically added as required. When an update request pointing to interface /account is received, the update request is pointed to one resource /account according to a rule, and Device_ID in the update request is written to a di attribute of the resource /account.

After the account is created, the second cloud platform generates an access token, i.e., Access_Token_D, for the Vclient, and returns Access_Token_D to the mediator by an update response message. Access_Token_D may be an original access token of the mediator, or may be a newly generated access token.

In operation 508, the user logs out of the second cloud platform, and logs in to the first cloud platform.

Here, the user switches login. Specifically, the user logs out the session with the second cloud platform, logs in to the first cloud platform by using User_ID_A and creates a session with the first cloud platform.

In operation 509, the mediator configures resource oic.r.coapcloudconf of the Vclient by using Access_Token_D and an ID of the second cloud platform.

Here, the ID of the second cloud platform includes at least one of a URI or a UUID.

Here, configuring resource oic.r.coapcloudconf of the Vclient refers to filling corresponding attributes of resource oic.r.coapcloudconf with the ID of the second cloud platform and Access_Token_D respectively.

In operation 510, the Vclient is registered to the second cloud platform by using configured resource oic.r.coapcloudconf.

Specifically, the Vclient is connected to the second cloud platform according to the ID (for example, the URI and the UUID) of the second cloud platform, and updates information of Access_Token_D, Device_ID, etc to the resource /account of the second cloud platform.

In operation 511, the second cloud platform verifies Access_Token_D. and after successful verification, associates Access_Token_D with User_ID_B and Device_ID.

Here, associating Access_Token_D with User_ID_B and Device_ID may be implemented by storing these three contents in the same relationship mapping table.

In operation 512, the Vclient establishes a session connection with the second cloud platform, and acquires a resource, published on the second cloud platform, of the server.

Specifically, the Vclient sends an update operation request to a session resource of the second cloud platform, and thus establishes the session connection with the second cloud platform. Here, the session resource is, for example the resource "/oic/sec/session".

The Vclient, as a client, subscribes to and acquires the resource, published on the second cloud platform, of the server to obtain a resource address of the server corresponding to User_ID_B, namely the second cloud platform returns a resource link corresponding to User_ID_B to the Vclient. There is made such a hypothesis that only one server (a UUID is 550E84(0-E29B-41D4-A716-446655440000) of the user is connected to the second cloud platform, and a resource address thereof is /Light. After the server is connected to the second cloud platform, the resource is published to a resource directory of the second cloud platform, and the form is as follows:

{
"anchor": "ocf://550E8400-E298-41D4-A716-446655440000",
"href": "/550E8400-E29B-41D4-A716-446655440000/Light",
"rt": ["oic.r.swtch.binary"],
"if": ["oic.if.a", "oic.if.baseline"],
"p": ["bm":3).
"eps": [{"ep": "coaps+tcp://{2001:db8:a::123]:2233"}]
}

In operation 513, the Vclient adds Device_ID to an obtained resource address of the server and publishes it to a resource list of the first cloud platform.

Specifically, the Vclient adds path Device_ID in front of the obtained resource address of the server, and may simultaneously modify anchor information, then publishes it to the resource list "/oic/res" of the first cloud platform. A published form is (if Device_ID is 88B7C7F0-4B51-4E0A-9FAA-CfB439FD7F49):
{
"anchor": "ocf://88B7C7F0-4B51-4EOA-9FAA-CfB439FD7F49",
"href": "/88B7C7F0-4B51-4EOA-9FAA-CfB439FD7F49/550E8400-E29B-41D4-A716-446655440000/Light",
"rt": ["oic.r.swtch.binary"],
"if": ["oic.if.a", "oic.if.baseline"],
"p": {"bm":3},
"eps": [{"ep": "coaps+tcp://[2001:db8:a::123]:2233"}]
}

In operation 514, a client acquires a resource list of User_ID_A.

Specifically, the user sends a query instruction to the first cloud platform via the client to query the resource list in the resource "/oic/res". The first cloud platform returns a resource address associated with User_ID_A to the client. Since the Vclient establishes the association relationship between Device_ID and User_ID_A in operation 503, the resource published by the Vclient may also be returned to the client.

In operation 515, the client sends an instruction to the server.

Specifically, the user sends the instruction to the server via the client. In an example, the instruction is:
UPDATE/88B7C7F0-4B51-4EOA-9FAA-CfB439FD7F49/550E8400-E29B-41D4-A716-4466554400(X)/Light {"state": true}.

The instruction is sent to the first cloud platform at first.

In operation 516, the first cloud platform judges according to a path in the instruction that the server and the client are connected to different cloud platforms.

In an example, the path is in an href form. The resource address of the server in the second cloud platform is /UUIDB/path, and the resource address of the server in the first cloud platform is /UUIDA/UUIDB/path, where UUIDB is the ID of the second cloud platform, and UUIDA is an ID of the first cloud platform.

Here, Device_ID may be parsed according to the path. In an example, Device_ID is 88B7C7F0-4B51-4EOA-9FAA-CfB439FD7F49.

In operation 517, the corresponding Vclient is found via Device_ID, and an instruction of the Vclient is constructed.

In operation 518, Device_ID in the instruction is removed, and the instruction is sent to the second cloud platform via the Vclient.

In an example, the instruction sent to the second cloud platform is:
UPDATE/550E8400-E298-41D4-A716-446655440000/Light {"state": true}.

In operation 519, after receiving the instruction, the second cloud platform forwards the instruction to the server.

In an example, the instruction sent to the server is UPDATE/Light {"state": true}.

After receiving the instruction, the server executes the instruction, and returns a result. The result is returned along the original path, and is finally presented to the user via the client.

Application Example 2

Figure 6:
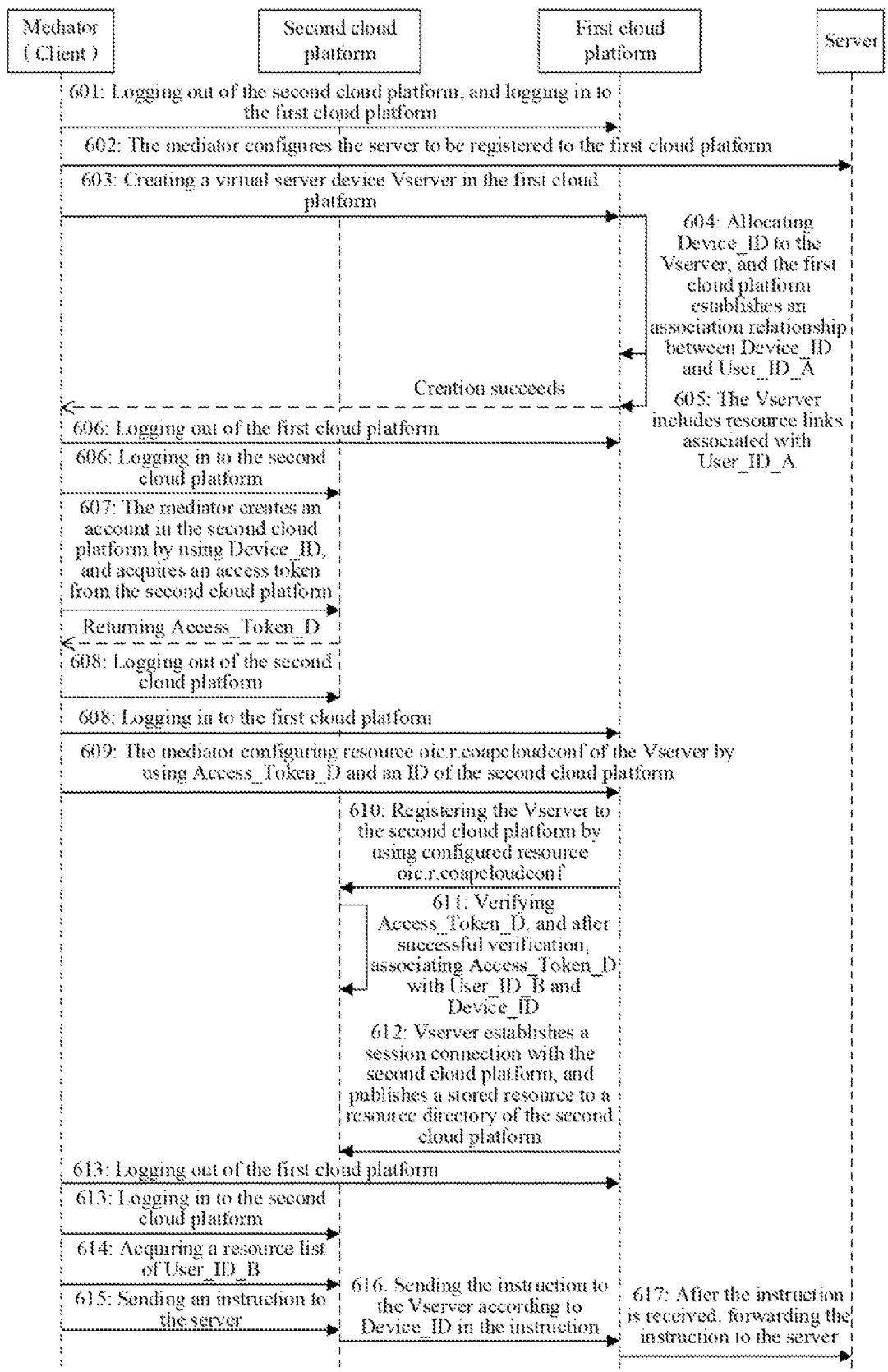
FIG. 6 is a fourth flowchart of a cloud communication method according to an embodiment of the present disclosure.

FIG. 6 is a fourth flowchart of a cloud communication method according to an embodiment of the present disclosure. As illustrated in FIG. 6, a flow of the cloud communication method includes the following operations.

In operation 601, a user logs out of a second cloud platform, and logs in to a first cloud platform.

Here, logging out of the second cloud platform refers to session logout or session disconnection from the second cloud platform. Then, a mediator is connected to the first cloud platform for a user registration, user account User_ID_A is created, and login to the first cloud platform is performed. It is to be noted that, if an account has been registered to the first cloud platform, login may be directly performed without creating an account. If it is first login on a client, a user name and password in the first cloud platform are required to be input. If it is not first login, an access token of the first cloud platform is kept in the client, and the user does not need to input the user name and the password, and directly establishes a session with the first cloud platform by using the access token.

In operation 602, a mediator configures a server to be registered to the first cloud platform.

Here, the operation that the mediator configures the server to be registered to the first cloud platform includes the following operations. The mediator acquires an access token of a server from the first cloud platform. The mediator configures resource coapcloudconf of the server. The server is connected with the first cloud platform, and the server is registered to the first cloud platform according to resource coapcloudconf. Then, the server establishes a session with the first cloud platform, and the server publishes its own resource to the first cloud platform.

It is to be noted that the operation 602 may also be executed after the operation 605.

In operation 603, a virtual device creation interface is accessed to create a virtual server device Vserver in the first cloud platform.

Here, there is the virtual device creation interface in the first cloud platform. The virtual device creation interface is, for example, interface /virtualdevice. The first cloud platform provides a resource link of the virtual device creation interface. The mediator may update virtual device information to the resource link to create a virtual device in the first cloud platform.

Here, the Vserver is embodied in the first cloud platform in a resource form. The resource is, for example, resource oic.r.coapcloudconf.

In operation 604, Device_ID is allocated to the Vserver, and the first cloud platform establishes an association relationship between Device_ID and User_ID_A.

Device_ID may be specified, carried in an update request message, and sent to interface /virtualdevice by the mediator when the Vserver is created, or may be allocated, carried in an update response message, and returned to the mediator by the first cloud platform when the Vclient is created.

In operation 605, The Vserver includes resource links associated with User_ID_A.

Here, the first cloud platform sends a resource published in a resource directory and associated with User_ID_A to the Vserver.

There is made such a hypothesis that only one server (a UUID is 550E8400-E29B-41D4-A716-446655440000) of the user is connected to the first cloud platform, and a resource address thereof is /Light. After the server is connected to the first cloud platform, this resource is published to the resource directory of the first cloud platform, and a form is as follows:

{
"anchor": "ocf://550E8400-E29B-41D4-A716-44665544000)",
"href": "/550E8400-E29B-41D4-A716-446655440000/Light",
"rt": ["oic.r.swtch.binary"],
"if": ["oic.if.a", "oic.if.baseline" ],
"p": {"bm":3),
"eps": [{"ep": "coaps+tcp://[2001:db8:a::123]:2233"}]
}

The above resource link is transferred from the resource directory of the first cloud platform to the Vserver. It is to be noted that transfer of the resource link is logical transfer, and the resource link is always in resource "/oic/res".

In operation 606, the user logs out of the first cloud platform, and logs in to the second cloud platform.

Here, the user switches login. Specifically, the user logs out the session with the first cloud platform, logs in to the second cloud platform by using User_ID_B, and establishes a session with the second cloud platform.

In operation 607, the mediator creates an account in the second cloud platform by using Device_ID, and acquires an access token from the second cloud platform.

Specifically, the mediator sends an update request to an account creation interface of the second cloud platform, the request carrying Device_ID. Here, the account creation interface is, for example, interface /account. The update request is configured to create an account of a Vserver in the second cloud platform. A creation form may be one of the following two forms.

Form 1: A data sheet including a device ID, a user ID, and an access token is maintained in the second cloud platform. When an update request pointing to interface /account is received, an item is added to the sheet, and Device_ID is extracted from the update request and inserted to an entry corresponding to the item.

Form 2: Multiple resources /account are stored in the second cloud platform in a distributed manner, and resources may be dynamically added as required. When an update request pointing to interface /account is received, the update request is pointed to one resource /account according to a rule, and Device_ID in the update request is written to a di attribute of the resource /account.

After the account is created, the second cloud platform generates an access token, i.e., Access_Token_D, for the Vserver, and returns Access_Token_D to the mediator by an update response message. Access_Token_D may be an original access token of the mediator, or may be a newly generated access token.

In operation 608, the user logs out of the second cloud platform, and logs in to the first cloud platform.

Here, the user switches login. Specifically, the user logs out the session with the second cloud platform, logs in to the first cloud platform by using User_ID_A, and establishes a session with the first cloud platform.

In operation 609, the mediator configures resource oic.r.coapcloudconf of the Vserver by using Access_Token_D and an ID of the second cloud platform.

Here, the ID of the second cloud platform includes at least one of a URI or a UUID.

Here, configuring resource oic.r.coapcloudconf of the Vserver refers to filling corresponding attributes of resource oic.r.coapcloudconf with Access_Token_D and the ID of the second cloud platform respectively.

In operation 610, the Vserver is registered to the second cloud platform by using configured resource oic.r.coapcloudconf.

Specifically, the Vserver is connected to the second cloud platform according to the ID (for example, the URI and the UUID) of the second cloud platform, and updates information of Access_Token_D, Device_ID, etc to resource/account of the second cloud platform.

In operation 611, the second cloud platform verifies Access_Token_D, and after successful verification, associates Access_Token_D with User_ID_B and Device_ID.

Here, associating Access_Token_D with User_ID_B and Device_ID may be implemented by storing these three contents in the same relationship mapping table.

In operation 612, the Vserver establishes a session connection with the second cloud platform, and publishes a stored resource to a resource directory of the second cloud platform.

Specifically, the Vserver sends an update operation request to a session resource of the second cloud platform, and then establishes the session connection with the second cloud platform. Here, the session resource is, for example resource "/oic/sec/session".

The Vserver, as a server device, publishes its own resource to the resource directory of the second cloud platform. In such case, the Vserver may be considered as a real server device, a UUID (Device_ID) thereof is assumed to be 0685B960-736F-46F7-BEC0-9E6CBD61ADC1, and ep adopts an address and port number of the first cloud platform. After the resource is published, the second cloud platform adds related information to the link for publication, and a form is as follows:

{
"anchor": "ocf://0685B960-736F-46F7-BEC0-9E6CBD61ADC1",
"href": "/0685B960-736F-46F7-BEC0-9E6CBD61ADC1-550E8400-E29B-41D4-A 716-446655440000/Light",
"rt":["oic.r.swtch.binary"],
"if": ["oic.if.a", "oic.if.baseline"],
"p": {"bm":3},
"eps": [{"ep": "coaps+tcp://example.com:443"}]
}

In operation 613, the user logs out of the first cloud platform, and logs in to the second cloud platform.

Here, the user switches login. Specifically, the user logs out the session with the first cloud platform, logs in to the second cloud platform by using User_ID_B, and establishes a session with the second cloud platform.

In operation 614, a client acquires a resource list of User_ID_B.

Specifically, the user sends a query instruction to the second cloud platform via the client to query the resource list in resource "/oic/res". The second cloud platform returns a resource address associated with User_ID_B to the client. Since the Vserver is also a device of User_ID_B that has been connected, the resource of the Vserver may also be returned to the client together.

In operation 615, the client sends an instruction to the server.

Specifically, the user sends the instruction to the server via the client. In an example, the instruction is:
UPDATE/0685B960-736F-46F7-BEC0-9E6CBD61ADC1/550E8400-E29B-41D4-A716-446655440000/Light {"state": true}.

The instruction is sent to the second cloud platform at first.

In operation 616, the second cloud platform sends the instruction to the Vserver according to Device_ID in the instruction.

Specifically, after receiving the instruction, the second cloud platform parses Device_ID of the Vserver according to a path in the instruction, and finds the session corresponding to the Vserver via Device_ID. Then, the second cloud platform removes Device_ID from the address in the instruction, and sends the instruction by the session.

Here, the path in the instruction is, for example, /0685B960-736F-46F7-BEC0-9E6CBD61ADC1/550E8400-E29B-41D4-A716-446655440000/Light.

Here, Device_ID of the Vserver is, for example, 0685B960-736F-46F7-BEC0-9E6CBD61ADC1.

Here, the instruction sent to the Vserver is, for example, UPDATE/550E8400-E29B-41D4-A716-446655440000/Light {"state": true}.

In operation 617, after receiving the instruction, the first cloud platform forwards the instruction to the server.

In an example, the instruction sent to the server is UPDATE/Light {"state": true}.

After receiving the instruction, the server executes the instruction, and returns a result. The result is returned along the original path, and is finally presented to the user via the client.

The cloud communication method illustrated in FIG. 6 may further be modified as follows to form a new solution.

The mediator may generate a device UUID of the virtual device in advance, create the account for the virtual device by using the UUID, and request the second cloud platform for the access token. Then, the virtual device is created in the first cloud platform by using the UUID as a device ID of the virtual device. As such, login switching operations of the user between the first cloud platform and the second cloud platform may be reduced.

Specifically, the following operations are additionally performed before the operation 601: operation 1, the client logs in to the second cloud platform; operation 2, the mediator generates the device UUID (recorded as Device_ID) of the virtual device, creates the account for the virtual device in the second cloud platform by using Device_ID, and requests the second cloud platform for the access token. As such, when the Vserver is created in operation 603, the ID of the Vserver is pre-configured Device_ID. Therefore, operations 606 to 608 may be deleted, and operation 609 is directly executed.

Application Example 3

Figure 7:
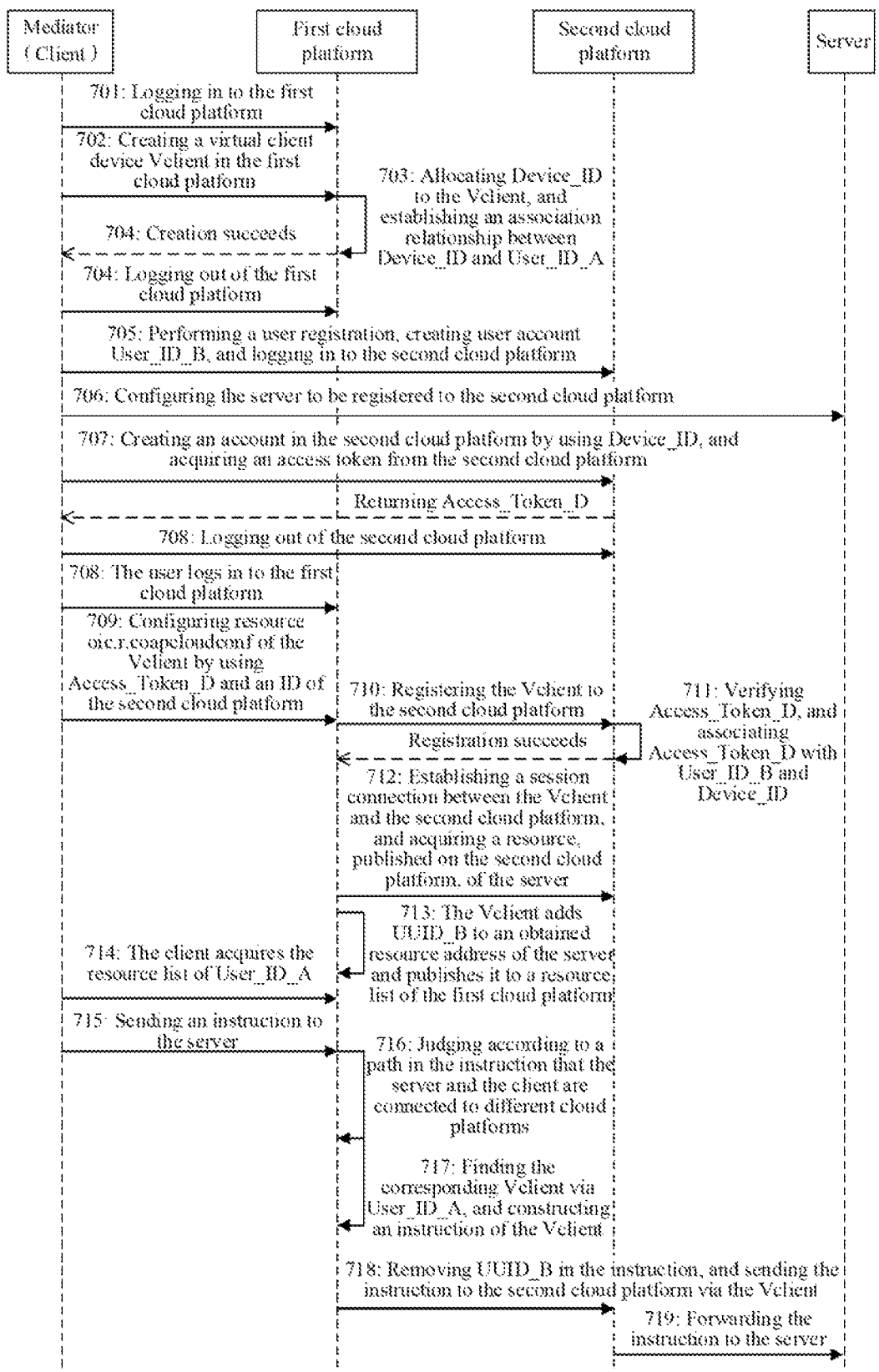
FIG. 7 is a fifth flowchart of a cloud communication method according to an embodiment of the present disclosure.

FIG. 7 is a fifth flowchart of a cloud communication method according to an embodiment of the present disclosure. As illustrated in FIG. 7, a flow of the cloud communication method includes the following operations.

In operation 701, a user logs in to a first cloud platform by using account User_ID_A.

Here, it is assumed that the user has registered account User_ID_A in the first cloud platform, and the user may log in to the first cloud platform by using User_ID_A in a client.

In operation 702, a virtual device creation interface is accessed to create a virtual client device Vclient in the first cloud platform.

Here, there is the virtual device creation interface in the first cloud platform. The virtual device creation interface is, for example, interface /virtualdevice. The first cloud platform provides a resource link of the virtual device creation interface. A mediator may update virtual device information to the resource link to create a virtual device in the first cloud platform.

Here, the Vclient is embodied in the first cloud platform in a resource form. The resource is, for example, resource oic.r.coapcloudconf.

In operation 703, Device_ID is allocated to the Vclient, and the first cloud platform establishes an association relationship between Device_ID and User_ID_A.

Here, after the Vclient is created, a configuration interface of resource "oic.r.coapcloudconf" may be exposed. The configuration interface is, for example, /virtualdevice/<deviceID>/coapcloudconf, where <deviceID> represents a device ID of the Vclient. In an example, <deviceID> is 88B7C7F0-4B51-4E0A-9FAA-CfB439FD7F49, and correspondingly, the configuration interface is /virtualdevice/88B7C7F0-4B51-4E0A-9FAA-CfB439FD7F49/coapcloudconf.

Device_ID may be specified, carried in an update request message, and sent to interface /virtualdevice by the mediator when the Vclient is created, or may be allocated, carried in an update response message, and returned to the mediator by the first cloud platform when the Vclient is created.

In operation 704, after successful creation, the user logs out of the first cloud platform.

Here, logging out of the first cloud platform refers to session logout or session disconnection from the first cloud platform.

In operation 705, a mediator is connected to a second cloud platform for a user registration, user account User_ID_B is created, and login to the second cloud platform is performed.

Here, if an account has been registered to the second cloud platform, login may be directly performed without creating an account. If it is first login on the client, a user name and password in the second cloud platform are required to be input. If it is not first login, an access token of the second cloud platform is kept in the client, and the user does not need to input the user name and the password, and directly establishes a session with the second cloud platform by using the access token.

In operation 706, the mediator configures a server to be registered to the second cloud platform.

Here, the operation that the mediator configures the server to be registered to the second cloud platform includes the following operations. The mediator acquires an access token of the server from the second cloud platform. The mediator configures resource coapcloudconf of the server. The server is connected with the second cloud platform, and the server is registered to the second cloud platform according to resource coapcloudconf. Then, the server establishes the session with the second cloud platform, and the server publishes its own resource to the second cloud platform.

It is to be noted that the operation 706 may also be executed after the operation 707.

In operation 707, the mediator creates an account in the second cloud platform by using Device_ID, and acquires an access token from the second cloud platform.

Specifically, the mediator sends an update request to an account creation interface of the second cloud platform, the request carrying Device_ID. Here, the account creation interface is, for example, interface /account. The update request is configured to create an account of a Vclient in the second cloud platform. A creation form may be one of the following two forms.

Form 1: A data sheet including a device ID, a user ID, and an access token is maintained in the second cloud platform. When an update request pointing to interface /account is received, an item is added to the sheet, and Device_ID is extracted from the update request and inserted to an entry corresponding to the item.

Form 2: Multiple resources/account are stored in the second cloud platform in a distributed manner, and resources may be dynamically added as required. When an update request pointing to interface /account is received, the update request is pointed to one resource /account according to a rule, and Device_ID in the update request is written to a di attribute of the resource /account.

After the account is created, the second cloud platform generates an access token, i.e., Access_Token_D, for the Vclient, and returns Access_Token_D to the mediator by an update response message. Access_Token_D may be an original access token of the mediator, or may be a newly generated access token.

In operation 708, the user logs out of the second cloud platform, and logs in to the first cloud platform.

Here, the user switches login. Specifically, the user logs out the session with the second cloud platform, logs in to the first cloud platform by using User_ID_A, and establishes a session with the first cloud platform.

In operation 709, the mediator configures resource oic.r-.coapcloudconf of the Vclient by using Access_Token_D and an ID of the second cloud platform.

Here, the ID of the second cloud platform includes at least one of a URI or a UUID.

Here, configuring resource oic.r.coapcloudconf of the Vclient refers to filling corresponding attributes of resource oic.r.coapcloudconf with Access_Token_D and the ID of the second cloud platform respectively.

In operation 710, the Vclient is registered to the second cloud platform by using configured resource oic.r.coapcloudconf.

Specifically, the Vclient is connected to the second cloud platform according to the ID (for example, the URI and the UUID) of the second cloud platform, and updates information of Access_Token_D, Device_ID, etc to resource /account of the second cloud platform.

In operation 711, the second cloud platform verifies Access_Token_D, and after successful verification, associates Access_Token_D with User_ID_B and Device_ID.

Here, associating Access_Token_D with User_ID_B and Device_ID may be implemented by storing these three contents in the same relationship mapping table.

In operation 712, the Vclient establishes a session connection with the second cloud platform, and acquires a resource, published on the second cloud platform, of the server.

Specifically, the Vclient sends an update operation request to a session resource of the second cloud platform, then establishes the session connection with the second cloud platform. Here, the session resource is, for example resource "/oic/sec/session".

The Vclient, as a client, subscribes to and acquires the resource, published on the second cloud platform, of the server to obtain a resource address of the server corresponding to User_ID_B, namely the second cloud platform returns a resource link corresponding to User_ID_B to the Vclient. There is made such a hypothesis that only one server (a UUID is 550E8400-E29B41D4-A716-446655440000) of the user is connected to the second cloud platform, and a resource address thereof is /Light. After the server is connected to the second cloud platform, the resource is published to a resource directory of the second cloud platform, and a form is as follows:

{
"anchor": "ocf://550E8400-E29B-41D4-A716-446655440000",
"href": "/550E8400-E29B-41D4-A716-446655440000/Light",
"rt": ["oic.r.swtch.binary"],
"if": ["oic.if.a", "oic.if.baseline"],
"p": {"bm":3},
"eps": [{"ep": "coaps+tcp://[2001:db8:a::123]:2233"}]
}

In operation 713, the Vclient adds UUID_B to an obtained resource address of the server and publishes it to a resource list of the first cloud platform.

Specifically, the Vclient adds path UUID_B (i.e., the UUID of the second cloud platform) in front of the obtained resource address of the server, and may simultaneously modify anchor and eps information, then publishes it to resource list "/oic/res" of the first cloud platform. A published form is (if the UUID of the second cloud platform is E61C3E6B-9C54-4B81-8CE5-F9039C1D04D9, and an address and a port number are coaps+tcp://example.com:443):

{
"anchor": "ocf://E61C3E6B-9C54-4B81-8CE5-F9039C1D04D9",
"href": "/E61C3E6B-9C54-4B81-8CE5-F9039C1D04D9/550E8400-E29B-41D4-A716-446655440000/Light",
"rt": ["oic.r.swtch.binary"],
"if": ["oic.if.a", "oic.if.baseline"],
"p": {"bm":3},
"eps": [{"ep": "coaps+tcp://example.com:443"}]
}

In operation 714, a client acquires a resource list of User_ID_A.

Specifically, the user sends a query instruction to the first cloud platform via the client to query the resource list in resource "oic/res". The first cloud platform returns a resource address associated with User_ID_A to the client. Since the Vclient establishes the association relationship between Device_ID and User_ID_A in operation 703, the resource published by the Vclient may also be returned to the client.

In operation 715, the client sends an instruction to the server.

Specifically, the user sends the instruction to the server via the client. In an example, the instruction is:
UPDATE/E61C3E6B-9C54-4B81-8CE5-F9039C1D04D9/550E8400-E29B-41D4-A716-446655440000/Light {"state": true}.

The instruction is sent to the first cloud platform at first.

In operation 716, the first cloud platform judges according to a path in the instruction that the server and the client are connected to different cloud platforms.

In an example, the path is in an href form. The resource address of the server in the second cloud platform is /UUIDB/path, and the resource address of the server in the first cloud platform is UUIDA/UUIDB/path, where UUIDB is the ID of the second cloud platform, and UUIDA is an ID of the first cloud platform. Furthermore, if the path includes an eps attribute, a judgment may also be made according to the address and port number of the ep.

Here, UUID_B may be parsed according to the path. In an example, UUID_B is E61C3E6B-9C54-4B81-8CE5-F9039C1D04D9.

In operation 717, the corresponding Vclient is found via User_ID_A, and an instruction of the Vclient is constructed.

Specifically, associated Device_ID (device ID of the Vclient) is found via User_ID_A. If there are multiple cloud platforms, such as a first cloud platform, a second cloud platform, and a third cloud platform, the first cloud platform being in intercommunication with the second cloud platform and the third cloud platform respectively, there may be two Vclients associated with User_ID_A in the first cloud platform, recorded as Vclient_B and Vclient_C respectively, and two associated Device_IDs, i.e., Device_ID_B (Vclient_B) and Device_ID_C (Vclient_C), may be found via User_ID_A. In such case, a further judgment is required to be made in combination with other conditions: the first is that eps of Vclient_B is consistent with eps of the second cloud platform, eps of Vclient_C is consistent with eps of the third cloud platform, and the eps attributes are compared to find the corresponding virtual client; the second is that a correspondence table of an ID of a virtual device and a UUID of a cloud that the virtual device is registered to is maintained in the first cloud platform, and the unique corresponding Device_ID is found in combination with the UUID, parsed in operation 717, of the cloud platform and the User_ID_A.

In operation 718. UUID_B in the instruction is removed, and the instruction is sent to the second cloud platform via the Vclient.

In an example, the instruction sent to the second cloud platform is:
UPDATE/550E8400-E29B-41D4-A716-446655440000/Light {"state": true}.

In operation 719, after receiving the instruction, the second cloud platform forwards the instruction to the server.

In an example, the instruction sent to the server is UPDATE/Light {"state": true}.

After receiving the instruction, the server executes the instruction, and returns a result. The result is returned along the original path, and is finally presented to the user via the client.

Figure 8:
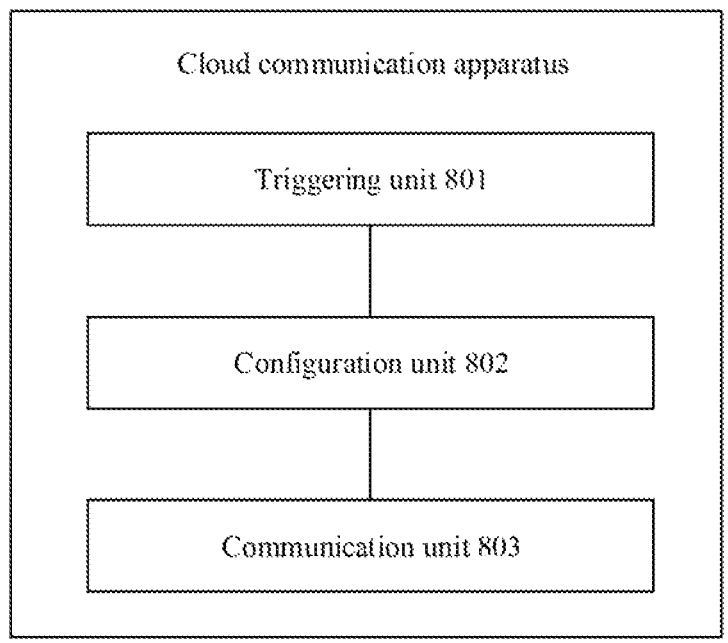
FIG. 8 is a first structure composition diagram of a cloud communication apparatus according to an embodiment of the present disclosure.

FIG. 8 is a first structure composition diagram of a cloud communication apparatus according to an embodiment of the present disclosure. The cloud communication apparatus is applied to a client side. As illustrated in FIG. 8, the cloud communication apparatus includes a triggering unit 801, a configuration unit 802, and a communication unit 803.

The triggering unit 801 is configured to trigger a first cloud platform to create a virtual device.

The configuration unit 802 is configured to configure registration information for the virtual device, the registration information being used for a registration of the virtual device to a second cloud platform.

The communication unit 803 is configured to perform communication with the second cloud platform or the first cloud platform via the virtual device in the first cloud platform.

In an implementation, the triggering unit 801 is configured to:
send a first request message to the first cloud platform, the first request message being used to request the first cloud platform to create the virtual device; and
receive a first response message from the first cloud platform, the first response message being used to indicate that the virtual device has been successfully created.

In an implementation, the virtual device has a first device ID.

The first device ID is configured by a client and carried in the first request message; or,
the first device ID is configured by the first cloud platform and carried in the first response message.

In an implementation, the configuration unit 802 is configured to acquire security information of the virtual device from the second cloud platform, and configure the registration information for the virtual device based on the security information.

In an implementation, the configuration unit 802 is configured to send a second request message to the second cloud platform, the second request message being used to request the second cloud platform to create an account for the virtual device, and receive a second response message from the second cloud platform, the second response message being used to indicate that the account has been successfully created for the virtual device, and the second response message carrying the security information of the virtual device.

In an implementation, the communication unit 803 is configured to acquire resource information of a server from the first cloud platform, the resource information of the server being acquired by the virtual device from the second cloud platform.

In an implementation, the communication unit 803 is configured to send a first instruction to the first cloud platform, the first instruction being sent to the second cloud platform via the virtual device in the first cloud platform and forwarded to the server by the second cloud platform.

In an implementation, the communication unit 803 is configured to receive a second instruction from the first cloud platform, the second instruction being sent to the second cloud platform by the server and forwarded to the virtual device in the first cloud platform by the second cloud platform.

In an implementation, the server is connected with the second cloud platform, and the virtual device is a virtual client device.

In an implementation, the communication unit 803 is configured to acquire resource information of a server from the second cloud platform, the resource information of the server being sent to the second cloud platform by the virtual device.

In an implementation, the communication unit 803 is configured to send a first instruction to the second cloud platform, the first instruction being sent to the virtual device in the first cloud platform via the second cloud platform and forwarded to the server by the first cloud platform.

In an implementation, the communication unit 803 is configured to receive a second instruction from the second cloud platform, the second instruction being sent to the first cloud platform by the server and forwarded to the second cloud platform by the virtual device in the first cloud platform.

In an implementation, the server is connected with the first cloud platform, and the virtual device is a virtual server device.

Figure 9:
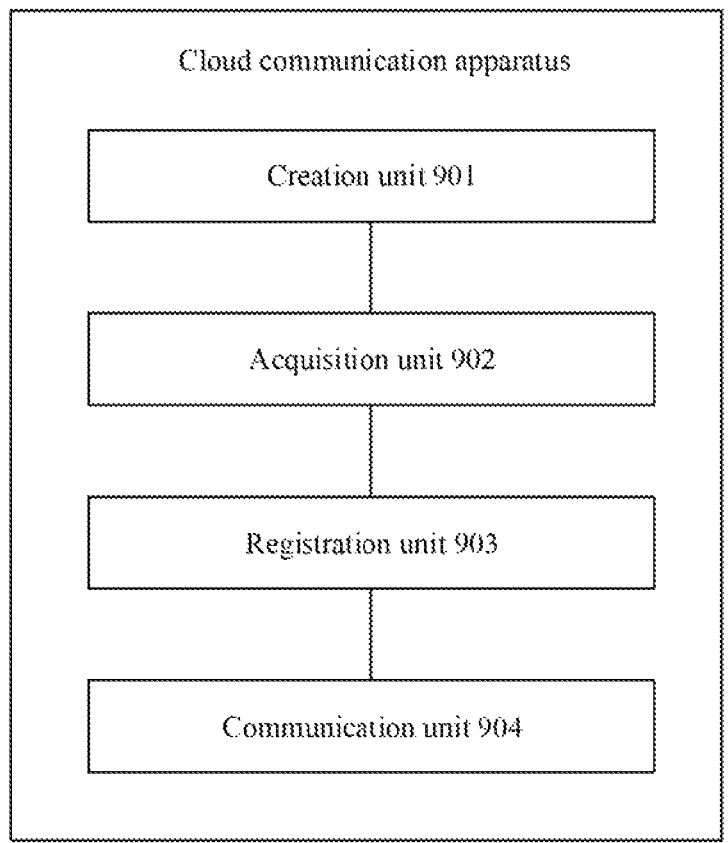
FIG. 9 is a second structure composition diagram of a cloud communication apparatus according to an embodiment of the present disclosure.

Those skilled in the art should know that functions realized by each unit in the cloud communication apparatus illustrated in FIG. 9 may be understood with reference to related descriptions about the cloud communication method. The functions of each module in the cloud communication apparatus illustrated in FIG. 8 may be realized by a program running in a processor, or may be realized by a specific logical circuit.

FIG. 9 is a second structure composition diagram of a cloud communication apparatus according to an embodiment of the present disclosure. The cloud communication apparatus is applied to a first cloud platform side. As illustrated in FIG. 9, the cloud communication apparatus includes a creation unit 901, an acquisition unit 902, a registration unit 903, and a communication unit 904.

The creation unit 901 is configured to create a virtual device.

The acquisition unit 902 is configured to acquire registration information from a client.

The registration unit 903 is configured to perform registration to a second cloud platform based on the registration information.

The communication unit 904 is configured to perform communication with the second cloud platform via the virtual device.

In an implementation, the creation unit 901 is configured to: receive a first request message from the client, the first request message being used to request a first cloud platform to create the virtual device, and after the virtual device is successfully created, send a first response message to the client, the first response message being used to indicate that the virtual device has been successfully created.

In an implementation, the virtual device has a first device ID.

The first device ID is configured by the client and carried in the first request message; or, the first device ID is configured by the first cloud platform and carried in the first response message.

In an implementation, the communication unit 904 is configured to acquire resource information of a server from the second cloud platform via the virtual device.

In an implementation, the communication unit 904 is configured to, after a first instruction is received from the client, forward the first instruction to the second cloud platform via the virtual device, then the first instruction is forwarded to the server via the second cloud platform.

In an implementation, the communication unit 904 is configured to, after a second instruction is received from the second cloud platform via the virtual device, send the second instruction to the client.

In an implementation, the server is connected with the second cloud platform, and the virtual device is a virtual client device.

In an implementation, the communication unit 904 is configured to send resource information of a server to the second cloud platform via the virtual device.

In an implementation, the communication unit 904 is configured to, after a first instruction is received from the server, forward the first instruction to the second cloud platform via the virtual device, then the first instruction is forwarded to the client via the second cloud platform.

In an implementation, the communication unit 904 is configured to, after a second instruction is received from the second cloud platform via the virtual device, send the second instruction to the server.

In an implementation, the server is connected with the first cloud platform, and the virtual device is a virtual server device.

Those skilled in the art should know that functions realized by each unit in the cloud communication apparatus illustrated in FIG. 9 may be understood with reference to related descriptions about the cloud communication method. The functions of each module in the cloud communication apparatus illustrated in FIG. 9 may be realized by a program running in a processor and a transceiver, or may be realized by a specific logical circuit.

Figure 10:
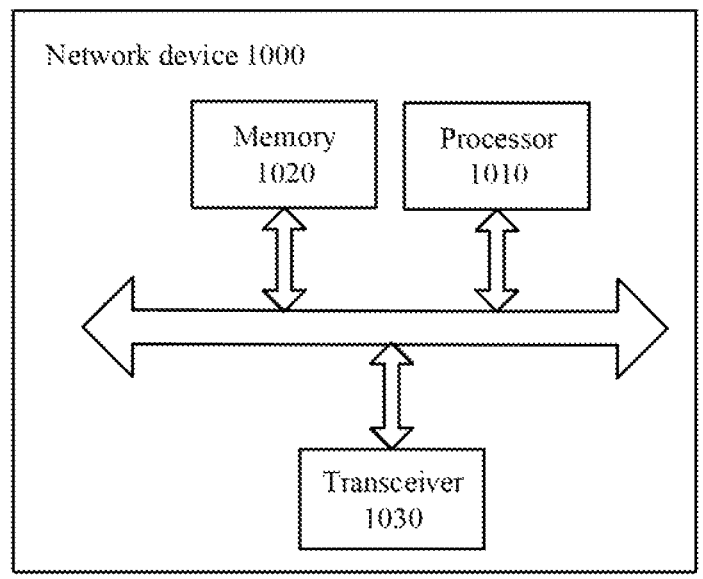
FIG. 10 is a schematic structure diagram of a network device according to an embodiment of the present disclosure.

FIG. 10 is a schematic structure diagram of a network device 1000 according to an embodiment of the present disclosure. The network device 1000 may be a cloud platform. The network device 1000 illustrated in FIG. 10 includes a processor 1010. The processor 1010 may call and run a computer program in a memory to implement the method in the embodiments of the present disclosure.

Optionally, as illustrated in FIG. 10, the network device 1000 may further include the memory 1020. The processor 1010 may call and run the computer program in the memory 1020 to implement the method in the embodiments of the present disclosure.

The memory 1020 may be an independent device independent of the processor 1010, or may be integrated into the processor 1010.

Optionally, as illustrated in FIG. 10, the network device 1000 may further include a transceiver 1030. The processor 1010 may control the transceiver 1030 to communicate with another device, specifically sending information or data to the other device or receiving information or data from the other device.

The transceiver 1030 may include a transmitter and a receiver. The transceiver 1030 may further include antennae. The number of the antennae may be one or more.

Optionally, the network device 1000 may specifically be a cloud communication configuration apparatus of the embodiments of the present disclosure, and the network device 1000 may implement corresponding flows implemented by the cloud communication configuration apparatus in each method of the embodiments of the present disclosure. For simplicity, elaborations are omitted herein.

Figure 11:
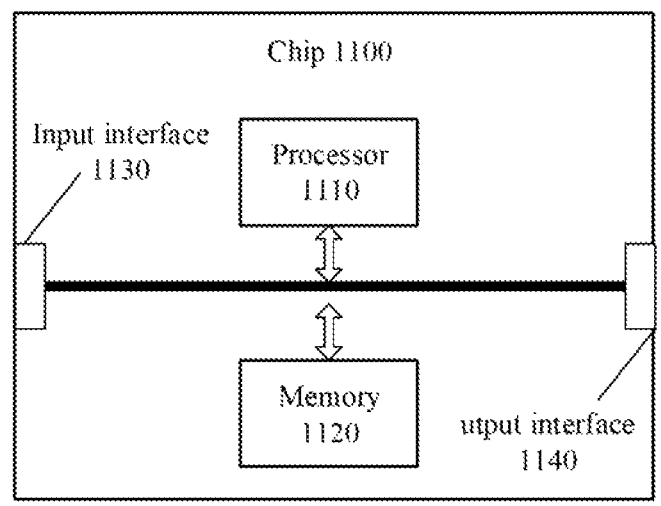
FIG. 11 is a schematic structure diagram of a chip according to another embodiment of the present disclosure.

FIG. 11 is a schematic structure diagram of a chip according to another embodiment of the present disclosure. The chip 1100 illustrated in FIG. 11 includes a processor 1110. The processor 1110 may call and run a computer program in a memory to implement the method in the embodiments of the present disclosure.

Optionally, as illustrated in FIG. 11, the chip 1100 may further include the memory 1120. The processor 1110 may call and run the computer program in the memory 1120 to implement the method in the embodiments of the present disclosure.

The memory 1120 may be an independent device independent of the processor 1110, or may be integrated into the processor 1110.

Optionally, the chip 1100 may further include an input interface 1130. The processor 1110 may control the input interface 1130 to communicate with another device or chip, specifically acquiring information or data sent by the other device or chip.

Optionally, the chip 1100 may further include an output interface 1140. The processor 1110 may control the output interface 1140 to communicate with the other device or chip, specifically outputting information or data to the other device or chip.

Optionally, the chip may be applied to the network device of the embodiments of the present disclosure, and the chip may implement corresponding flows implemented by the network device in each method of the embodiments of the present disclosure. For simplicity, elaborations are omitted herein.

It is to be understood that the chip mentioned in the embodiment of the present disclosure may also be called a system-level chip, a system chip, a chip system, a system on chip, etc.

The embodiments of the present disclosure also provide a computer-readable storage medium, which is configured to store a computer program.

Optionally, the computer-readable storage medium may be applied to a network device in the embodiments of the present disclosure, and the computer program enables a computer to execute corresponding flows implemented by the network device in each method of the embodiments of the present disclosure. For simplicity, elaborations are omitted herein.

Optionally, the computer-readable storage medium may be applied to a mobile terminal/terminal device in the embodiments of the present disclosure, and the computer program enables a computer to execute corresponding flows implemented by the mobile terminal/terminal device in each method of the embodiments of the present disclosure. For simplicity, elaborations are omitted herein.

The embodiments of the present disclosure also provide a computer program product, which includes a computer program instruction.

Optionally, the computer program product may be applied to a network device in the embodiments of the present disclosure, and the computer program instruction enables a computer to execute corresponding flows implemented by the network device in each method of the embodiments of the present disclosure. For simplicity, elaborations are omitted herein.

Optionally, the computer program product may be applied to a mobile terminal/terminal device in the embodiments of the present disclosure, and the computer program instruction enables the computer to execute corresponding flows implemented by the mobile terminal/terminal device in each method of the embodiments of the present disclosure. For simplicity, elaborations are omitted herein.

The embodiments of the present disclosure also provide a computer program.

Optionally, the computer program may be applied to a network device in the embodiments of the present disclosure, and the computer program runs in a computer to enable the computer to execute corresponding flows implemented by the network device in each method of the embodiments of the present disclosure. For simplicity, elaborations are omitted herein.

Optionally, the computer program may be applied to a mobile terminal/terminal device in the embodiments of the present disclosure, and the computer program runs in the computer to enable the computer to execute corresponding flows implemented by the mobile terminal/terminal device in each method of the embodiments of the present disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed by hardware or software depends on specific applications and design constraints of the technical solutions. Professionals may realize the described functions for each specific application by use of different methods, but such realization shall fall within the scope of the application.

Those skilled in the art may clearly learn about that specific working processes of the system, apparatus and unit described above may refer to the corresponding processes in the method embodiment and will not be elaborated herein for ease and briefness of description.

It should be understood that although the operations of the flowcharts are shown sequentially as indicated by arrows, the operations are not necessarily performed sequentially as indicated by the arrows. Unless specifically stated otherwise herein, the operations are not performed in a strict order of limitation, and the operations may be performed in other orders. Moreover, at least a part of the operations in the flowcharts may include multiple sub operations or multiple stages that are not necessarily performed at the same time, but may be performed at different times, and the operations or stages are not necessarily performed in sequence, but rather may be performed in turns or alternation with other operations or at least a part of the operations or stages in the other operations.

In some embodiments provided in the application, it is to be understood that the disclosed system, apparatus and method may be implemented in another manner. For example, the apparatus embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented by some interfaces, of the apparatus or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purposes of the solutions of the embodiments according to a practical requirement.

In addition, each function unit in each embodiment of the present disclosure may be integrated into a processing unit, each unit may also physically exist independently, and two or more than two units may also be integrated into a unit.

When realized in form of software function unit and sold or used as an independent product, the function may also be stored in a computer-readable storage medium. Based on such an understanding, the technical solutions of the present disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the present disclosure. The abovementioned storage medium includes: various media capable of storing program codes such as a U disk, a mobile hard disk, a Read-Only Memory (ROM), a Random Access Memory (RAM), a magnetic disk, or an optical disk.

The above is only the specific implementation of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A method for cloud communication, comprising:
   triggering, by a client, a first cloud platform to create a virtual device, wherein the virtual device is a virtual device for a server;
   configuring, by the client, registration information for the virtual device, the registration information being used for a registration of the virtual device to a second cloud platform; and
   when the server is connected with the first cloud platform and the client is connected with the second cloud platform performing, by the client, a communication with the server via the virtual device in the first cloud platform.

2. The method of claim 1, wherein triggering, by the client, the first cloud platform to create the virtual device comprises:
   sending, by the client, a first request message to the first cloud platform, the first request message being used to request the first cloud platform to create the virtual device; and
   receiving, by the client, a first response message from the first cloud platform, the first response message being used to indicate that the virtual device has been successfully created.

3. The method of claim 2, wherein the virtual device has a first device Identifier (ID);
   the first device ID is configured by the client and carried in the first request message; or,
   the first device ID is configured by the first cloud platform and carried in the first response message.

4. The method of claim 1, wherein configuring, by the client, the registration information for the virtual device comprises:
   acquiring, by the client, security information of the virtual device from the second cloud platform; and
   configuring, by the client, the registration information for the virtual device based on the security information.

5. The method of claim 4, wherein acquiring, by the client, the security information of the virtual device from the second cloud platform comprises:
   sending, by the client, a second request message to the second cloud platform, the second request message being used to request the second cloud platform to create an account for the virtual device; and
   receiving, by the client, a second response message from the second cloud platform, the second response message being used to indicate that the account has been successfully created for the virtual device, and the second response message carrying the security information of the virtual device.

6. The method of claim 1, wherein performing, by the client, the communication with the server via the virtual device in the first cloud platform comprises:
   acquiring, by the client, resource information of the server from the second cloud platform, the resource information of the server being sent to the second cloud platform by the virtual device.

7. The method of claim 1, wherein performing, by the client, the communication with the server via the virtual device in the first cloud platform comprises:
   sending, by the client, a first instruction to the second cloud platform, the first instruction being sent to the virtual device in the first cloud platform via the second cloud platform and forwarded to the server by the first cloud platform.

8. The method of claim 1, wherein performing, by the client, the communication with the server via the virtual device in the first cloud platform comprises:
   receiving, by the client, a second instruction from the second cloud platform, the second instruction being sent to the first cloud platform by the server and forwarded to the second cloud platform by the virtual device in the first cloud platform.

9. A method for cloud communication, comprising:
   creating, by a first cloud platform, a virtual device, wherein the virtual device is a virtual device for a server:
   acquiring, by the virtual device, registration information from a client, and performing a registration to a second cloud platform based on the registration information; and
   when the server is connected with the first cloud platform and the client is connected with the second cloud platform, performing, by the first cloud platform, a communication with the second cloud platform via the virtual device.

10. The method of claim 9, wherein creating, by the first cloud platform, the virtual device comprises:
    receiving, by the first cloud platform, a first request message from the client, the first request message being used to request the first cloud platform to create the virtual device; and
    after the virtual device is successfully created, sending, by the first cloud platform, a first response message to the client, the first response message being used to indicate that the virtual device has been successfully created.

11. The method of claim 9, wherein performing, by the first cloud platform, the communication with the second cloud platform via the virtual device comprises:
    sending, by the first cloud platform, resource information of the server to the second cloud platform via the virtual device.

12. The method of claim 9, wherein performing, by the first cloud platform, the communication with the second cloud platform via the virtual device comprises:
    after a first instruction is received from the server, forwarding, by the first cloud platform, the first instruction to the second cloud platform via the virtual device for forwarding to the client via the second cloud platform.

13. The method of claim 9, wherein performing, by the first cloud platform, the communication with the second cloud platform via the virtual device comprises:
    after a second instruction is received from the second cloud platform via the virtual device, sending, by the first cloud platform, the second instruction to the server.

14. A cloud communication apparatus, comprising a processor, wherein the processor is configured to:
    trigger a first cloud platform to create a virtual device, wherein the virtual device is a virtual device for a server;

configure registration information for the virtual device, the registration information being used for a registration of the virtual device to a second cloud platform; and when the server is connected with the first cloud platform and the client is connected with the second cloud platform, perform a communication with the second cloud platform or the first cloud platform via the virtual device in the first cloud platform.

15. The apparatus of claim 14, wherein the apparatus further comprises a transceiver, and the processor is configured to control the transceiver to:

send a first request message to the first cloud platform, the first request message being used to request the first cloud platform to create the virtual device; and receive a first response message from the first cloud platform, the first response message being used to indicate that the virtual device has been successfully created.

16. The apparatus of claim 14, wherein the processor is configured to:

acquire security information of the virtual device from the second cloud platform; and configure the registration information for the virtual device based on the security information.

17. The apparatus of claim 14, wherein the processor is configured to acquire resource information of the server from the second cloud platform, the resource information of the server being sent to the second cloud platform by the virtual device.

18. The apparatus of claim 15, wherein the processor is configured to control the transceiver to send a first instruction to the second cloud platform, the first instruction being sent to the virtual device in the first cloud platform via the second cloud platform and forwarded to the server by the first cloud platform.

19. The apparatus of claim 15, wherein the processor is configured to control the transceiver to receive a second instruction from the second cloud platform, the second instruction being sent to the first cloud platform by the server and forwarded to the second cloud platform by the virtual device in the first cloud platform.

* * * * *